(12) United States Patent
Tsubouchi

(10) Patent No.: US 8,473,554 B2
(45) Date of Patent: Jun. 25, 2013

(54) INFORMATION PROCESSING APPARATUS

(75) Inventor: Masatoshi Tsubouchi, Tokyo (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 111 days.

(21) Appl. No.: 12/399,133

(22) Filed: Mar. 6, 2009

(65) Prior Publication Data

US 2009/0300123 A1   Dec. 3, 2009

(30) Foreign Application Priority Data

May 27, 2008 (JP) ................................ P2008-137469

(51) Int. Cl.
*G06F 15/16* (2006.01)
(52) U.S. Cl.
USPC .......................................... 709/206; 709/204
(58) Field of Classification Search
USPC .................................. 709/206, 204
See application file for complete search history.

(56) References Cited

U.S. PATENT DOCUMENTS

| | | | | |
|---|---|---|---|---|
| 6,108,688 | A * | 8/2000 | Nielsen | 709/206 |
| 2005/0033845 | A1 * | 2/2005 | Perepa et al. | 709/226 |
| 2005/0193078 | A1 * | 9/2005 | Jordan, Jr. | 709/206 |
| 2007/0005407 | A1 * | 1/2007 | Wu | 705/8 |
| 2007/0061423 | A1 * | 3/2007 | Accapadi et al. | 709/219 |
| 2009/0055498 | A1 * | 2/2009 | Brown | 709/207 |

FOREIGN PATENT DOCUMENTS

| | | |
|---|---|---|
| JP | 2001-008270 | 1/2001 |
| JP | 2002-007282 A | 1/2002 |
| JP | 2003-163963 A | 6/2003 |
| JP | 2004-021892 A | 1/2004 |
| JP | 2004-128589 A | 4/2004 |

OTHER PUBLICATIONS

JP Office Action dated Mar. 13, 2012 as received in application No. 2008-137469.

* cited by examiner

*Primary Examiner* — Dustin Nguyen
*Assistant Examiner* — Joel Mesa
(74) *Attorney, Agent, or Firm* — Maschoff Brennan

(57) ABSTRACT

An information processing apparatus includes a receiving unit configured to receive, from at least one other information processing apparatus, an electronic mail for which a notification time at which notification of receipt of the electronic mail is to be provided is specified; a storage unit configured to store the electronic mail received by the receiving unit; a clock unit configured to provide time information; a notification-time determining unit configured to determine whether a current time obtained by the clock unit has passed the notification time specified for the electronic mail; and a reception notification unit configured to read out, if the notification-time determining unit determines that the specified notification time has been passed, the electronic mail stored in the storage unit and provide notification of receipt of the electronic mail.

12 Claims, 6 Drawing Sheets

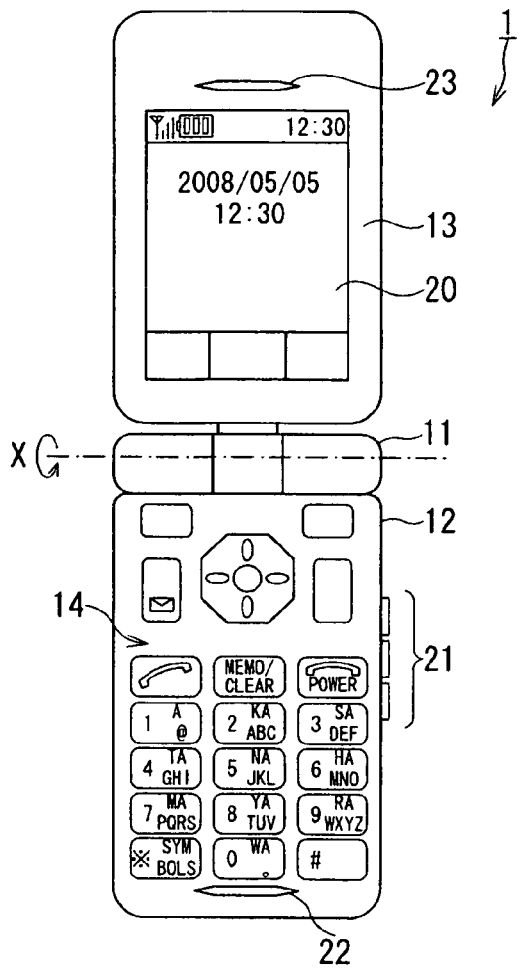
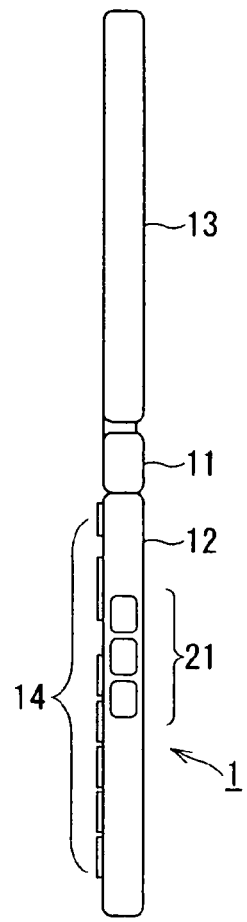
FIG. 1A  FIG. 1B
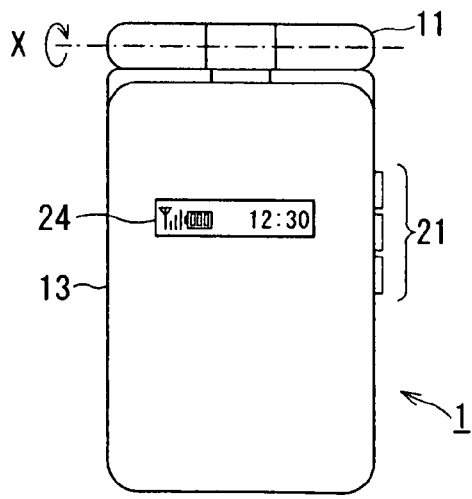
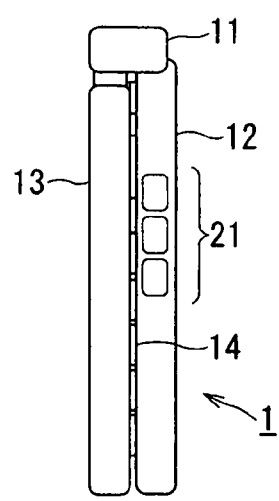
FIG. 2A  FIG. 2B

INFORMATION PROCESSING APPARATUS

BACKGROUND OF THE INVENTION

1. Field of the Invention

The present invention relates to information processing apparatuses, and particularly to an information processing apparatus such as a cellular phone capable of specifying a date and time at which notification of receipt of an electronic mail (e-mail) message is to be provided.

2. Description of the Related Art

Information processing apparatuses, such as cellular phones and personal computers, are capable of transmitting and receiving e-mail messages via a network. A sender of an e-mail message enters a destination, subject and body of the e-mail message and performs a transmission operation in the information processing apparatus. A recipient of the e-mail message is notified of receipt of the e-mail message with a notifying method such as a ringtone, vibration, or the like. Upon notification, the recipient checks the content of the received e-mail message.

According to Japanese Unexamined Patent Application Publication No. 2003-163963, among information processing apparatuses having such e-mail capabilities, a cellular phone capable of transmitting an e-mail message at a specified date and time is known. This cellular phone having such e-mail function can automatically transmit an e-mail message at a specified date and time. Therefore, if the user wants an e-mail message to be delivered at a specific date and time, such as a birthday or anniversary, the user may be prevented from forgetting to send the message.

The cellular phone disclosed in Japanese Unexamined Patent Application Publication No. 2003-163963 can effectively prevent the user from forgetting to send an e-mail message at a specific-date and time. Therefore, if the user wants to deliver a message on a specified date, such as a recipient's birthday, it is possible to effectively prevent the user from forgetting to send the message.

However, on specific dates and times such as Christmas and New Year's Day when a large number of users want to send messages, a large number of e-mail messages tend to be transmitted and received in a short period of time. Since a very intensive load is imposed on the network on such specific dates and times, certain restrictions are placed in advance on e-mail transmission and reception.

The cellular phone disclosed in Japanese Unexamined Patent Application Publication No. 2003-163963 can specify a date and time of e-mail transmission, but can not prevent such an intensive load on the network.

SUMMARY OF THE INVENTION

The present invention has been made in view of the circumstances described above. An object of the present invention is to provide an information processing apparatus capable of specifying, at a transmitting end, a date and time of notification of receipt of an e-mail message to be transmitted; while capable of providing, at a receiving end, notification of receipt of an e-mail message if a date and time specified for the e-mail message is passed.

To solve the problems described above, an information processing apparatus according to an aspect of the present invention includes an electronic mail generating unit configured to generate an electronic mail; a notification-time specifying unit configured to specify a notification time at which notification of receipt of the received e-mail is to be provided at a destination; and a transmitting unit configured to transmit, to at least one other information processing apparatus, the electronic mail for which the notification time is specified by the notification-time specifying unit.

An information processing apparatus according to another aspect of the present invention includes a receiving unit configured to receive, from at least one other information processing apparatus, an electronic mail for which a notification time at which notification of receipt of the electronic mail is to be provided is specified; a storage unit configured to store the electronic mail received by the receiving unit; a clock unit configured to provide time information; a notification-time determining unit configured to determine whether a time obtained by the clock unit passes the notification time specified for the electronic mail; and a reception notification unit configured to notify receipt of the electronic mail stored in the storage unit if the notification-time determining unit determines that the specified notification time is passed.

The information processing apparatus according to the present invention is capable of preventing the user from forgetting to send an e-mail that the user wants to deliver at a specified time. Additionally, the information processing apparatus according to the present invention is capable of reducing load imposed on a network by transmission and reception of e-mails in a specific period of time.

BRIEF DESCRIPTION OF THE DRAWINGS

FIG. 1A and FIG. 1B illustrate external configurations of a flip cellular phone being an example of an information processing apparatus according to an embodiment of the present invention.

FIG. 2A and FIG. 2B illustrate other external configurations of the cellular phone illustrated in FIG. 1A and FIG. 1B.

DESCRIPTION OF THE PREFERRED EMBODIMENTS

Figure 3:
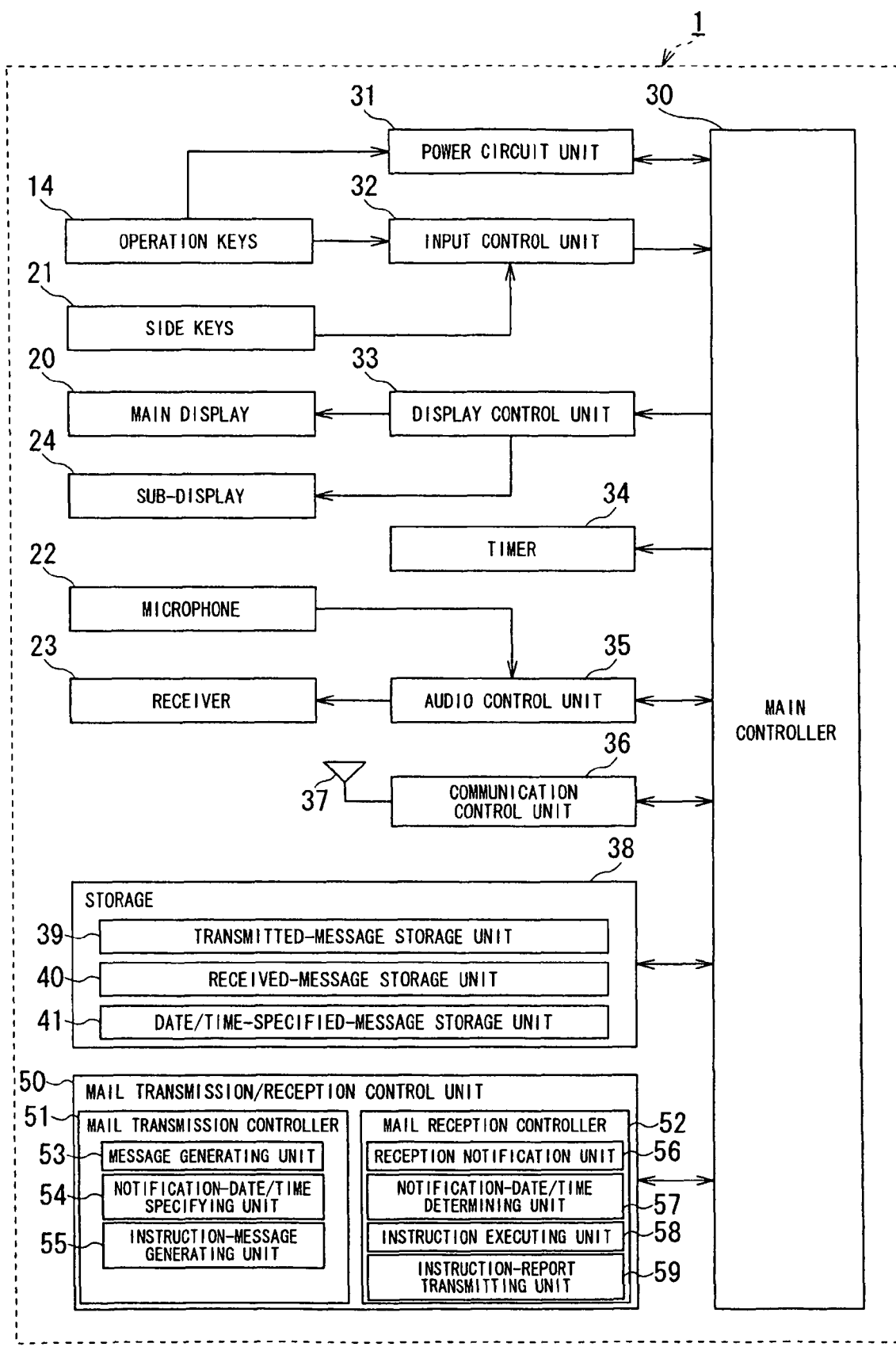
FIG. 3 illustrates an internal configuration of a cellular phone according to an embodiment of the present invention.

An information processing apparatus according to an embodiment of the present invention will now be described with reference to the attached drawings.

FIG. 1A and FIG. 1B illustrate external configurations of a flip cellular phone being an example of an information processing apparatus according to an embodiment of the present invention. FIG. 1A illustrates an external configuration of a cellular phone 1 open about 180 degrees as viewed from the front. FIG. 1B illustrates an external configuration of the cellular phone 1 in the open state of FIG. 1A as viewed from one side.

As illustrated in FIG. 1A and FIG. 1B, the cellular phone 1 includes a first housing 12 and a second housing 13 that are hinge-connected to each other with a hinge part 11 in the middle. The cellular phone 1 is formed so as to be foldable in an arrow X direction via the hinge. A transmitting and receiving antenna is provided at a predetermined position inside the cellular phone 1. The cellular phone 1 may transmit and receive radio waves to and from a base station via the built-in antenna.

The first housing 12 has operation keys 14 on a surface. The operation keys 14 include arrow keys, an enter key, and character input keys. The arrow keys and the enter key are provided in the upper part of the first housing 12. The arrow keys include four keys for up, down, left, and right directions. By operating the arrow keys in the up, down, left, and right directions, a cursor displayed on a main display 20 in the second housing 13 can be moved in the up, down, left, and right directions. Specifically, the user uses arrow keys to perform various operations on the main display 20, such as cursor positioning on a character input screen, scrolling of an address book and a list of e-mail messages, page flipping operation for flipping through simple websites, and image scrolling operation.

Pressing the enter key confirms various functions. For example, in accordance with a user's operation of the arrow keys, a desired phone number is selected from a plurality of phone numbers on the address book displayed on the main display 20. Then, if the enter key is pressed toward the inside of the first housing 12, the selection of the desired phone number is confirmed and thus, the desired phone number is called.

The first housing 12 has side keys 21 for operating the cellular phone 1. Predetermined processing is assigned to each of the side keys 21. By pressing a side key 21 toward the inside of the first housing 12 when the cellular phone 1 is in the open or closed state, predetermined processing assigned to the pressed side key 21 is executed.

The first housing 12 has a microphone 22 under the operation keys 14. The microphone 22 collects user's voice during a call.

A battery pack is attached to the back side of the first housing 12. If a call-end key or a power key is turned on, each circuit unit is activated to an operable state by power supplied thereto from the battery pack.

The second housing 13 has the main display 20 on its front side. The main display 20 may be a liquid crystal display (LCD), an organic electroluminescence (EL) display, an inorganic EL display, a surface-conduction electron-emitter display (SED), or the like.

The main display 20 displays a reception condition of radio waves, a remaining battery level, names and phone numbers registered in the address book, a transmission history, content of an e-mail message, a simple website, content received from an external content server (not shown), etc.

A receiver (phone receiver) 23 serving as an audio output unit is provided at a predetermined position above the main display 20. This allows the user to make a voice call. A speaker also serving as a voice output unit is provided at a predetermined position in the cellular phone 1.

FIG. 2A and FIG. 2B illustrate other external configurations of the flip cellular phone 1 illustrated in FIG. 1A and FIG. 1B. The cellular phone 1 of FIG. 2A and FIG. 2B is in a closed state reached by pivoting the second housing 13 of the cellular phone 1 of FIG. 1A and FIG. 1B in the direction of arrow X (see FIG. 1A). FIG. 2A illustrates an external configuration of the cellular phone 1 in the closed state as viewed from the front. FIG. 2B illustrates an external configuration of the cellular phone 1 in the closed state as viewed from one side.

The second housing 13 has a sub-display 24 such as an LCD to display an antenna pictograph indicating a current level of antenna sensitivity, a battery pictograph indicating a remaining battery level of the cellular phone 1, a current time, etc.

FIG. 3 illustrates an internal configuration of the cellular phone 1 according to an embodiment of the present invention.

The cellular phone 1 illustrated in FIG. 3 includes a main controller 30, a power circuit unit 31, an input control unit 32, a display control unit 33, a timer 34, an audio control unit 35, a communication control unit 36, a storage 38, and a mail transmission/reception control unit 50, which are connected in such a manner that they can communicate with each other via a bus.

The main controller 30 includes a central processing unit (CPU). The CPU generates various control signals and supplies the control signals to various parts to perform overall control of the cellular phone 1. The CPU performs input control processing in response to an input received from the operation keys 14, various other types of control processing, computations, etc.

The power circuit unit 31 switches the power ON and OFF in response to a user input from the operation keys 14. If the power is ON, the power circuit unit 31 causes a power supply source (e.g., battery) to supply power to various parts so as to make the cellular phone 1 operable.

The input control unit 32 includes an input interface for the operation keys 14 and side keys 21. Upon detecting that any of the operation keys 14 and side keys 21 is pressed, the input control unit 32 generates a signal corresponding to the pressed key and transmits the generated signal to the main controller 30.

The display control unit 33 includes a display interface for the main display 20 and sub-display 24. In accordance with control of the main controller 30, the display control unit 33 displays display information, including text and images, on the main display 20 and sub-display 24.

The timer 34 measures a current time. In the present embodiment, the timer 34 serves as a clock unit configured to provide time information.

In accordance with control of the main controller 30, the audio control unit 35 generates an analog speech signal from voice collected by the microphone 22, and converts the generated analog speech signal to a digital speech signal. Upon obtaining a digital speech signal, in accordance with control of the main controller 30, the audio control unit 35 converts the obtained digital speech signal to an analog speech signal and outputs the analog speech signal as voice from the receiver 23.

In accordance with control of the main controller 30, the communication control unit 36 performs de-spread spectrum processing on a received signal received from a base station via an antenna 37 to reconstruct data. In accordance with an instruction from the main controller 30, the reconstructed data may be transmitted to the audio control unit 35 and output from the receiver 23, may be transmitted to the display control unit 33 and displayed on the main display 20, or may be recorded in the storage 38. Also, in accordance with control of the main controller 30, upon obtaining speech data collected by the microphone 22, data input from the operation keys 14, or data stored in the storage 38, the communication control unit 36 performs spread spectrum processing on the obtained data and transmits the processed data after the speed spectrum processing to the base station via the antenna 37.

The storage 38 includes a read only memory (ROM), hard disk, and nonvolatile memory for storing processing programs and data necessary for processing performed by the main controller 30, and further includes a random access memory (RAM) for temporarily storing data that the main controller 30 uses to perform processing. The storage 38 stores various groups of data and application programs for an e-mail function etc. executed by the CPU of the main controller 30.

The storage 38 includes a transmitted-message storage unit 39, a received-message storage unit 40, and a date/time-specified-message storage unit 41. The transmitted-message storage unit 39 stores transmitted messages, that is, e-mail messages transmitted by a mail transmission controller 51. The received-message storage unit 40 stores received messages, that is, e-mail messages received by a mail reception controller 52. Among received messages, those for which a date and time of notification of receipt is specified are stored in the date/time-specified-message storage unit 41. The date/time-specified-message storage unit 41 is configured to be inaccessible, so that received messages stored in the date/time-specified-message storage unit 41 are not viewable.

E-mail messages are stored in the transmitted-message storage unit 39, received-message storage unit 40, and date/time-specified-message storage unit 41 along with their respective destinations, subjects and bodies, and unique IDs assigned at the time of transmission.

The mail transmission/reception control unit 50 includes the mail transmission controller 51 and the mail reception controller 52.

The mail transmission controller 51 includes a message generating unit 53, a notification-date/time specifying unit 54, and an instruction-message generating unit 55.

The mail transmission controller 51 not only serves as a transmitting unit, but also controls all the components included therein. The mail transmission controller 51 transmits an e-mail message generated by the message generating unit 53 to at least one other cellular phone specified as a destination. If a plurality of destinations are specified, the mail transmission controller 51 transmits the generated e-mail message to the plurality of specified destinations simultaneously. The mail transmission controller 51 assigns a unique ID to each e-mail message to be transmitted.

In order to distinguish, from other transmitted messages, a transmitted message for which a date and time of notification of its receipt and content (hereinafter referred to as "receipt etc.") is specified, the mail transmission controller 51 adds a date/time-specified mark to such a transmitted message for which a date and time of notification of receipt etc. is specified. Then, the mail transmission controller 51 stores the marked transmitted message in the transmitted-message storage unit 39. The date/time-specified mark is deleted if the specified notification date and time is passed. A transmitted message to which a date/time-specified mark is added is not deleted until the specified date and time of notification is passed.

By selecting a transmitted message provided with a date/time-specified mark and accepting an input of a predetermined instruction, the cellular phone 1 at a transmitting end can transmit, to the cellular phone 1 at a receiving end or the like, an instruction to change the specified date and time of notification or an instruction to delete the selected transmitted message, until the specified date and time is passed. The mail transmission controller 51 transmits a generated instruction (instruction signal) as an instruction message to the cellular phone 1 at the receiving end.

The message generating unit 53 generates an e-mail message on the basis of an input received from the operation keys 14. The message generating unit 53 generates an e-mail message containing a destination address, subject, and body.

The notification-date/time specifying unit 54 serves as a notification-time specifying unit. Before transmission of an e-mail message generated by the message generating unit 53, the notification-date/time specifying unit 54 specifies a date and time of notification of receipt etc. of the e-mail message at the cellular phone 1 being a destination of the e-mail message at the receiving end. The date and time specified by the notification-date/time specifying unit 54 is a date and time later than the date and time of transmission of the e-mail message.

The instruction-message generating unit 55 serves as a time-change-instruction generating unit. For an e-mail message transmitted by the mail transmission controller 51 and for which a date and time of notification of receipt etc. is specified, the instruction-message generating unit 55 generates an instruction message containing an instruction (an instruction signal) to change the specified date and time of notification. Additionally, the instruction-message generating unit 55 serves as a deletion-instruction generating unit. For an e-mail message transmitted by the mail transmission controller 51 and for which a date and time of notification of receipt etc. is specified, the instruction-message generating unit 55 generates an instruction message containing an instruction (an instruction signal) to delete this e-mail message.

The instruction-message generating unit 55 generates an instruction message containing an instruction for at least one of transmitted messages stored in the transmitted-message storage unit 39, the one being selected from among transmitted messages to which date/time-specified marks are added. The instruction message generated by the instruction-message generating unit 55 contains an instruction to change the notification date and time specified for the selected transmitted message, or an instruction to delete the selected transmitted message. The instruction message generated by the instruction-message generating unit 55 also contains information which allows identification of an e-mail message to which the instruction is directed, from among e-mail messages (received messages) received by the cellular phone 1 at the receiving end. Examples of the information which allows identification of such an e-mail message include a unique ID assigned to the e-mail message at the time of transmission by the cellular phone 1 at the transmitting end.

The instruction-message generating unit 55 has a command table which associates an instruction to be executed by the cellular phone 1 at the receiving end with the corresponding command to be contained in the instruction message. Upon accepting a predetermined instruction, the instruction-message generating unit 55 refers to the command table and generates an instruction message which contains a command associated with the predetermined instruction.

An instruction message generated by the instruction-message generating unit 55 contains only a command representing an instruction to be executed and an ID assigned to an e-mail message to which the instruction is directed. Therefore, regardless of the size of the transmitted message for which the instruction message is generated, the size of the instruction message is small.

The mail reception controller 52 includes a reception notification unit 56, a notification-date/time determining unit 57, an instruction executing unit 58, and an instruction-report transmitting unit 59.

The mail reception controller 52 not only serves as a receiving unit, but also controls all the components included therein. The mail reception controller 52 receives e-mail messages including an e-mail message for which a date and time of notification of receipt etc. of the e-mail message is specified. Each of the received e-mail messages is assigned a unique ID by the cellular phone 1 at the transmitting end. The mail reception controller 52 also receives an instruction message transmitted for a received message for which a date and time of notification of receipt etc. is specified.

Additionally, the mail reception controller 52 supplies an instruction to the reception notification unit 56 as to when to provide notification of receipt etc. of a received message.

The reception notification unit 56 supplies notification of receipt and content of a received message in accordance with an instruction from the mail reception controller 52. For example, in order to provide notification of receipt of a message, the reception notification unit 56 activates a vibrator, or controls the audio control unit 35 to output a ringtone from the speaker. The reception notification unit 56 may control the display control unit 33 such that an icon or a pop-up window is displayed on the main display 20 or sub-display 24, thereby notifying that a message has been received. In response to a press of a predetermined operation key 14, the reception notification unit 56 may cause the main display 20 or sub-display 24 to display content of a received message. Then, the reception notification unit 56 stores, in the received-message storage unit 40, the received message for which notification of its receipt has been provided.

In a case where an e-mail message for which a date and time of notification is specified is received, if the reception notification unit 56 receives an instruction from the notification-date/time determining unit 57 to perform notification of receipt etc, the reception notification unit 56 notifies receipt etc. of the e-mail message. In other words, when a current date and time matches the specified date and time of notification, the reception notification unit 56 notifies the user at the receiving end of receipt etc. of the received message in such a manner as if the received message has just been received.

The notification-date/time determining unit 57 serves as a notification-time determining unit. The notification-date/time determining unit 57 obtains a current date and time from the timer 34 to compare the current date and time with a notification date and time specified for a received message. If a predetermined result of comparison is obtained, the notification-date/time determining unit 57 provides predetermined notification to each unit. For example, the notification-date/time determining unit 57 determines whether the current date and time has passed the notification date and time specified for the received message. If it is determined that the specified date and time of notification has been passed, the notification-date/time determining unit 57 causes the reception notification unit 56 to provide notification of receipt etc. of the received message.

Instead of obtaining a current date and time from the timer 34, the notification-date/time determining unit 57 may obtain information from the network via the communication control unit 36, which serves as another clock unit, as a real date and time, and use the obtained information to determine whether a specified date and time of notification has been passed. The phrase "real date and time" refers to a correct date and time at a current location, and does not refer to a date and time measured by the timer 34 specifically designed for the cellular phone 1. For example, a real date and time is received for use in managing an expiration date for content downloaded to the cellular phone 1.

For example, if the timer 34 for the cellular phone 1 is one which allows the user to set any date and time, the user of the cellular phone 1 at the receiving end may set the timer 34 ahead, if the user wants to immediately check a received message for which a date and time of notification is specified. Even in such a case, if a real correct date and time is obtained from the network via the communication control unit 36, it is possible to prevent notification of receipt from been provided before the specified date and time desired by the user of the cellular phone 1 at the transmitting end is passed.

The notification-date/time determining unit 57 may be configured such that either a date and time measured by the timer 34, or a real date and time via the communication control unit 36 can be obtained. The timer 34 may be configured to serve as a second clock unit which does not allow the user to change setting of time information.

The instruction executing unit 58 serves as a notification-time changing unit. Upon receiving an instruction message for changing a date and time of notification specified for a received message stored in the date/time-specified-message storage unit 41, the instruction executing unit 58 changes the date and time of notification of receipt etc. of the corresponding received message. Specifically, upon receiving such an instruction message, the instruction executing unit 58 searches received messages stored in the date/time-specified-message storage unit 41 for the corresponding received message on the basis of the sender of the instruction message and an ID for the corresponding received message, the ID being contained in the instruction message. Then, in accordance with the instruction message, the instruction executing unit 58 changes the notification date and time specified for the corresponding received message.

The instruction executing unit 58 may serve as a message deleting unit. Upon receiving an instruction message for deleting a received message stored in the date/time-specified-message storage unit 41, the instruction executing unit 58 deletes the corresponding received message. Specifically, upon receiving such an instruction message, the instruction executing unit 58 searches received messages stored in the date/time-specified-message storage unit 41 Specifically, upon receiving such an instruction message, the instruction executing unit 58 searches received messages stored in the date/time-specified-message storage unit 41 for the corresponding received message on the basis of the sender of the instruction message and an ID for the corresponding received message, the ID being contained in the instruction message. Then, the instruction executing unit 58 deletes the corresponding received message.

The instruction executing unit 58 has a command table identical to that in the cellular phone 1 at the transmitting end. Upon receiving an instruction message containing a predetermined instruction, the instruction executing unit 58 refers to the command table to identify an instruction to be executed, the instruction being associated with a command contained in the instruction message. In accordance with the identified instruction, the instruction executing unit 58 executes appropriate processing.

If the instruction executing unit 58 receives an instruction from the cellular phone 1 at the transmitting end but does not execute processing based on the received instruction, the instruction-report transmitting unit 59 transmits a report describing this to the cellular phone 1 from which the instruction message has been transmitted. The report transmitted by the instruction-report transmitting unit 59 may contain an ID for an e-mail message to which the instruction is directed, the content of the instruction, and a description explaining that the processing based on the instruction has not been executed.

Figure 4:
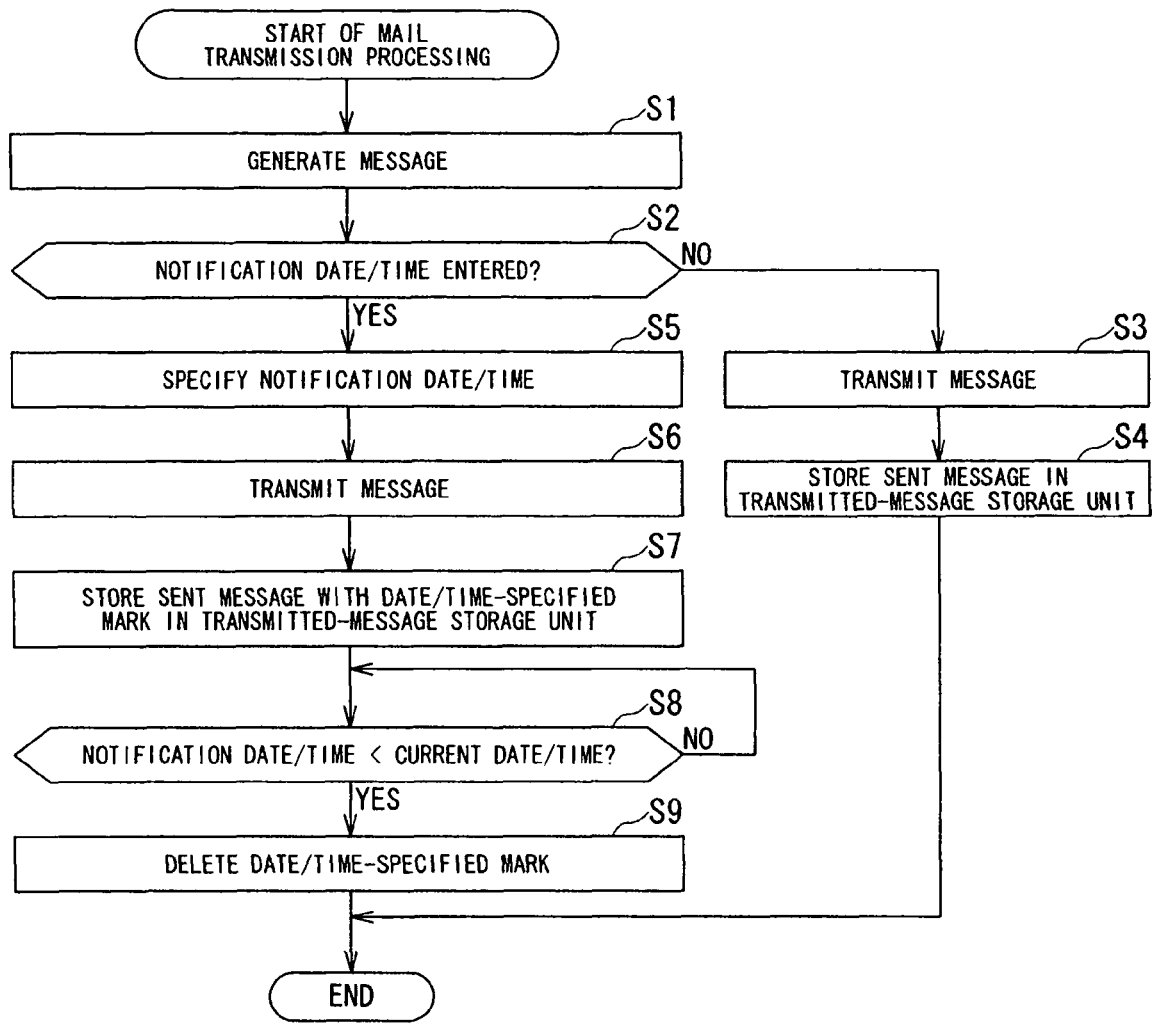
FIG. 4 is a flowchart illustrating mail transmission processing executed by a mail transmission controller of a cellular phone at a transmitting end in accordance with an embodiment of the present invention.

FIG. 4 is a flowchart illustrating mail transmission processing executed by the mail transmission controller 51 of the cellular phone 1 at the transmitting end in accordance with an embodiment of the present invention.

The mail transmission processing illustrated in FIG. 4 is executed after an e-mail application program in the cellular phone 1 is started to generate and transmit an e-mail message.

In step S1, on the basis of an input received from the operation keys 14, the message generating unit 53 generates an e-mail message containing a destination address, subject, and body. If necessary, data is attached as an attachment to the e-mail message.

In step S2, the notification-date/time specifying unit 54 determines whether a date and time of notification of receipt etc. is entered for the e-mail message generated in step S1. For example, after the e-mail message is generated in step S1, the main display 20 displays a selection screen which allows the user to select whether notification of receipt etc. of the e-mail message is to be provided to the cellular phone 1 at the receiving end immediately after transmission of the e-mail message, or such notification is not to be immediately provided but to be provided at a specified date and time. Thus, the user's selection is accepted through the displayed selection screen.

If it is determined that the date and time of notification of receipt etc. is not entered (NO in step S2), the mail transmission controller 51 transmits the generated e-mail message to the specified destination in step S3. In step S4, the mail transmission controller 51 stores the transmitted e-mail message in the transmitted-message storage unit 39. The processing thus ends.

On the other hand, if it is determined that the date and time of notification of receipt etc. is entered by the user (YES in step S2), the notification-date/time specifying unit 54 specifies the date and time entered from the operation keys 14 for the generated e-mail message as the date and time of notification of receipt etc. at the cellular phone 1 at the receiving end. The date and time specified here is later than a current date and time measured by the timer 34 for the cellular phone 1 at the transmitting end, or later than a real date and time obtained via the communication control unit 36.

In step S6, the mail transmission controller 51 assigns a unique ID to the generated e-mail message and transmits the message to the specified destination. In step S7, the mail transmission controller 51 added a date/time-specified mark to the transmitted message and stores the message in the transmitted-message storage unit 39.

In step S8, the mail transmission controller 51 determines whether the current date and time obtained from the timer 34 has passed the notification date and time specified for the transmitted message stored in the transmitted-message storage unit 39. If it is determined that the specified notification date and time has not been passed (NO in step S8), the mail transmission controller 51 suspends the processing until the specified notification date and time is passed. On the other hand, if it is determined that the specified notification date and time has been passed (YES in step S8), in step S9, the mail transmission controller 51 deletes the date/time-specified mark added to the transmitted message stored in the transmitted-message storage unit 39. Thus, the processing executed at the transmitting end ends.

If a plurality of destinations are simultaneously specified in step S1, a date and time of notification of receipt may be specified for each of the destinations in step S5.

The number of e-mail messages to be transmitted by the cellular phone 1 at the transmitting end and for which dates and times of notification are specified may be limited to a predetermined number. By limiting the number of such e-mail messages, it is possible to prevent malicious mischief, such as transmitting a large number of junk e-mail messages at a specific date and time or intentionally causing an overflow of the date/time-specified-message storage unit 41 in the cellular phone 1 at the receiving end.

Next, a description will given as to mail reception processing executed in the cellular phone 1 at the receiving end in response to the mail transmission processing executed in the cellular phone 1 at the transmitting end.

Figure 5:
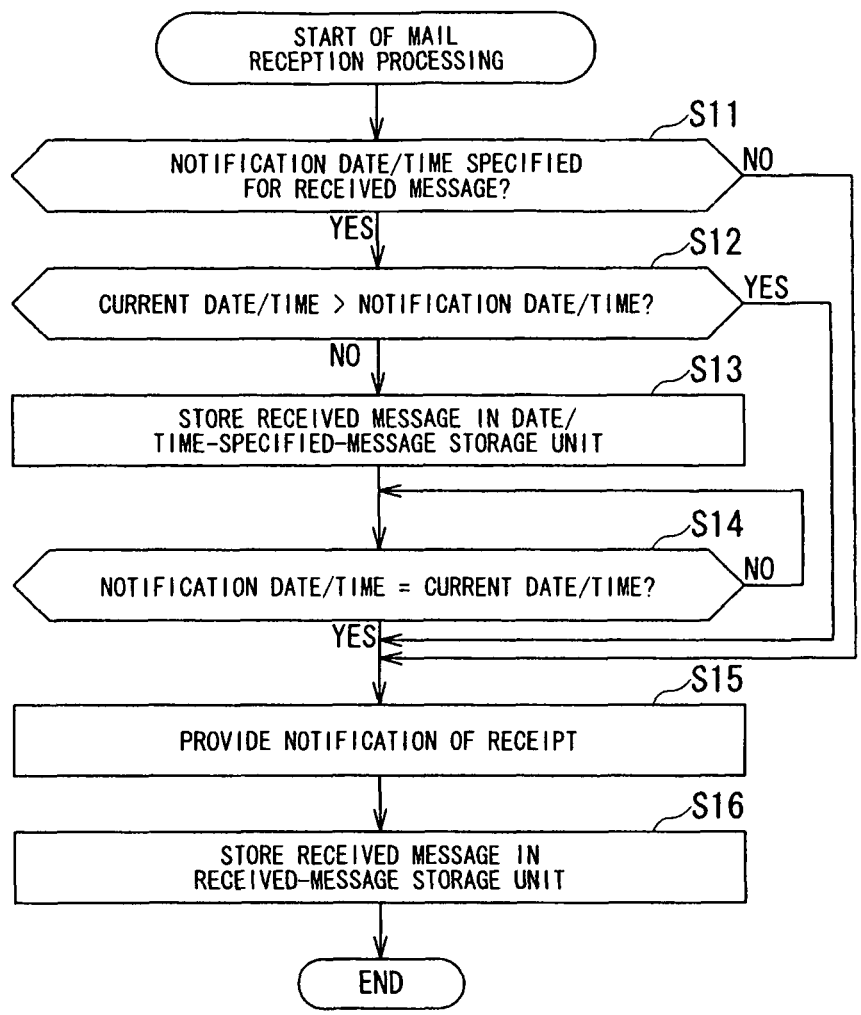
FIG. 5 is a flowchart illustrating mail reception processing executed by a mail reception controller of a cellular phone at a receiving end in accordance with an embodiment of the present invention.

FIG. 5 is a flowchart illustrating mail reception processing executed by the mail reception controller 52 of the cellular phone 1 at the receiving end in accordance with an embodiment of the present invention.

The mail reception processing illustrated in FIG. 5 is executed after the mail reception controller 52 in the mail transmission/reception control unit 50 performs reception of an e-mail message from another information processing apparatus.

In step S11, the mail reception controller 52 determines whether the received e-mail message is a received message for which a date and time of notification of receipt etc. is specified. If it is determined that the received e-mail message is not a received message for which a date and time of notification of receipt etc. is specified (NO in step S11), the mail reception controller 52 notifies the reception notification unit 56 that notification of receipt is to be provided. Then, the processing proceeds to step S15.

On the other hand, if it is determined that the received e-mail message is a received message for which a date and time of notification of receipt etc. is specified (YES in step S11), the notification-date/time determining unit 57 determines in step S12 whether the current date and time obtained from the timer 34 has passed the notification date and time specified for the received message. If it is determined that the current date and time has passed the notification date and time (YES in step S12), the notification-date/time determining unit 57 notifies the reception notification unit 56 that notification of receipt is to be provided. Then, the processing proceeds to step S15.

On the other hand, if it is determined that the current date and time has not yet passed the specified date and time of notification (NO in step S12), the mail reception controller 52 stores the received message in the date/time-specified-message storage unit 41 in step S13.

In step S14, for the received message stored in the date/time-specified-message storage unit 41, the notification-date/time determining unit 57 determines whether the current date and time matches the specified date and time of notification of receipt etc. The notification-date/time determining unit 57 compares the current date and time obtained from the timer 34 or the like with the specified date and time of notification so as to determine whether they match. If the notification-date/time determining unit 57 determines that the current date and time does not match the specified date and time of notification (NO in step S14), the processing is suspended until they match.

On the other hand, if the notification-date/time determining unit 57 determines that the current date and time matches the specified date and time of notification (YES in step S14), the reception notification unit 56 outputs a ringtone in step S15 to notify the user of receipt of an e-mail message. When a predetermined operation key 14 is pressed, the reception notification unit 56 displays content of the received message on the main display 20 or sub-display 24 to the user.

In particular, when the received message for which notification of receipt etc. is provided is a received message for which a date and time of notification is specified, the reception notification unit 56 provide notification to the user at the receiving end in such a manner as if the message has just been received.

In step S16, the reception notification unit 56 stores, in the received-message storage unit 40, the received message for which the notification of receipt etc. has been provided to the user. Thus, the processing executed at the receiving end ends.

If the number of received messages that can be stored in the date/time-specified-message storage unit 41 is exceeded, the received messages may be moved to the received-message storage unit 40 in order of proximity of the specified notification date and time to the current date and time. Alternatively, the received messages may be moved to the received-message storage unit 40 in order of actual receipt of the received message for which a date and time of notification is specified.

Here, the sender of a received message moved to the received-message storage unit 40 expects that notification of receipt of the received message will be made on the specified date and time. Therefore, the cellular phone 1 at the transmitting end may be notified that the notification of receipt etc. has been made before the specified date and time of notification is passed.

In the description above, in step S15, notification is made as to both the receipt and content of the received e-mail message. Alternatively, notification of only receipt of the received e-mail message may be made, and notification of content of the received e-mail message may not necessarily have to be made.

Next, a description will be given as to processing executed in the cellular phone 1 at the transmitting end to generate an instruction for a transmitted e-mail message for which a date and time of notification of receipt is specified. Specifically, this processing involves generating an instruction to change a specified date and time of notification or an instruction to delete an e-mail message already transmitted to the cellular phone 1 at the receiving end.

Figure 6:
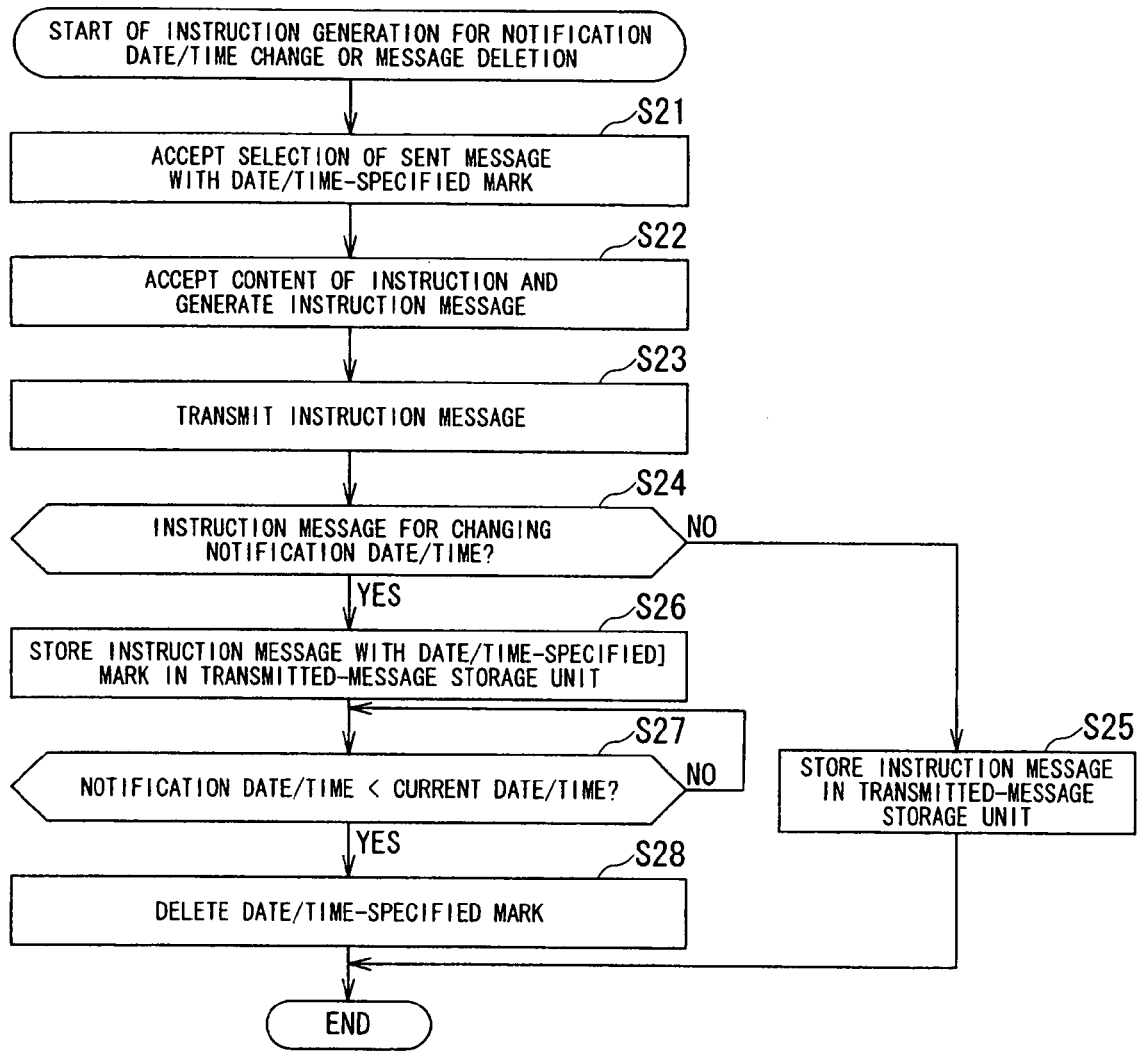
FIG. 6 is a flowchart illustrating processing that a mail transmission controller of a cellular phone at a transmitting end executes to generate an instruction to change a date and time of notification or an instruction to delete a sent message, in accordance with an embodiment of the present invention.

FIG. 6 is a flowchart illustrating processing that the mail transmission controller 51 of the cellular phone 1 at the transmitting end executes to generate an instruction to change a date and time of notification or an instruction to delete a transmitted message, in accordance with an embodiment of the present invention.

The processing illustrated in FIG. 6 is executed as necessary after the mail transmission controller 51 transmits an e-mail message for which a date and time of notification of receipt is specified.

In step S21, the instruction-message generating unit 55 accepts a selection of one transmitted message to which a date/time-specified mark is added, the one being selected from among transmitted messages stored in the transmitted-message storage unit 39. The transmitted messages stored in the transmitted-message storage unit 39 are listed on the main display 20 by an e-mail application program in order of date and time of transmission. Then, the instruction-message generating unit 55 accepts a selection of one of the transmitted messages listed.

In step S22, for the transmitted message for which the selection has been accepted in step S21, the instruction-message generating unit 55 accepts, through the main display 20, an instruction to change the date and time of notification or an instruction to delete the message. Then, the instruction-message generating unit 55 generates an instruction message containing the accepted instruction.

If an instruction to change the date and time of notification is accepted, the instruction-message generating unit 55 refers to a command table to generate an instruction message containing a command for changing the specified date and time of notification to a new date and time of notification, and an ID for the message for which the instruction is to be executed.

If an instruction to delete the message is accepted, the instruction-message generating unit 55 refers to, for example, the command table to generate an instruction message containing a command for deleting the message and an ID for the message to be deleted.

In step S23, the mail transmission controller 51 transmits the generated instruction message to the cellular phone 1 at the receiving end.

In step S24, the mail transmission controller 51 determines whether the transmitted instruction message is an instruction message for changing the date and time of notification. If it is determined that the transmitted instruction message is not for changing the date and time of notification, but for message deletion (NO in step S24), the mail transmission controller 51 stores the transmitted instruction message in the transmitted-message storage unit 39 in step S25. Thus, the processing ends.

On the other hand, if it is determined that the transmitted instruction message is for changing the date and time of notification (YES in step S24), the mail transmission controller 51 adds a date/time-specified mark to the transmitted instruction message and stores this message in the transmitted-message storage unit 39 in step S26.

In step S27, the mail transmission controller 51 determines whether the current date and time obtained from the timer 34 has passed the notification date and time specified in the instruction message stored in the transmitted-message storage unit 39. If it is determined that the specified date and time of notification has not yet been passed (NO in step S27), the processing is suspended until the specified date and time of notification is passed. On the other hand, if it is determined that the specified date and time of notification has been passed (YES in step S27), the mail transmission controller 51 deletes in step S28 the date/time-specified mark added to the transmitted message. Thus, the processing ends.

Next, a description will be given as to processing executed in the cellular phone 1 at the receiving end to change a date and time of notification or delete a received message. This processing is executed in response to processing executed in the cellular phone 1 at the transmitting end to generate an instruction to change a date and time of notification or an instruction to delete a transmitted message.

Figure 7:
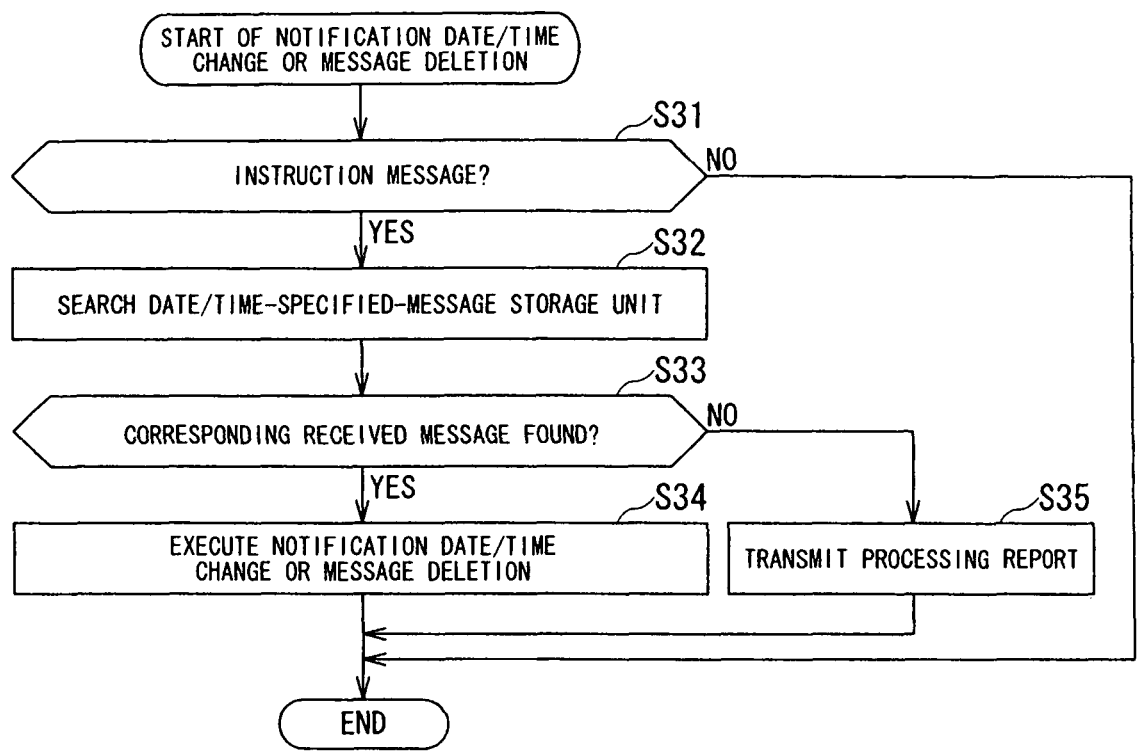
FIG. 7 is a flowchart illustrating processing that a mail reception controller of a cellular phone at a receiving end executes to change a date and time of notification or delete a received message, in accordance with an embodiment of the present invention.

FIG. 7 is a flowchart illustrating processing that the mail reception controller 52 of the cellular phone 1 at the receiving end executes to change a date and time of notification or delete a received message, in accordance with an embodiment of the present invention.

The processing illustrated in FIG. 7 is executed after the mail reception controller 52 in the mail transmission/reception control unit 50 performs reception of an e-mail message.

In step S31, the mail reception controller 52 determines whether the received e-mail message is an instruction message transmitted for a received message for which a date and time of notification is specified. If it is determined that the received e-mail message is not an instruction message (NO in step S31), the processing ends.

On the other hand, if it is determined that the received e-mail message is an instruction message (YES in step S31), the instruction executing unit 58 searches, in step S32, for a received message stored in the date/time-specified-message storage unit 41 on the basis of an ID assigned to the received message and contained in the instruction message.

If the received message for which a predetermined instruction has been accepted is found (YES in step S33), the instruction executing unit 58 executes predetermined processing on the received message, in step S34, as directed by the instruction message. Specifically, if an instruction message is received, the instruction executing unit 58 refers to a command table to determine processing to be executed, on the basis of a command contained in the received instruction message.

If the received instruction message is for changing the notification date and time specified for the received message found in step S33, the instruction executing unit 58 changes the specified date and time of notification of receipt etc. of the received message to another notification date and time contained in the instruction message. Alternatively, if the received instruction message is for deleting the received message found in step S33, the instruction executing unit 58 deletes the received message from the date/time-specified-message storage unit 41. Thus, the processing ends.

If the received message for which a predetermined instruction has been accepted is not found (NO in step S33), the instruction-report transmitting unit 59 transmits a report, in step S35, to the cellular phone 1 serving as a sender of the instruction message. The report transmitted in step S35 indicates that the received message corresponding to the instruction message does not exist, and that predetermined processing directed by the instruction message has not been executed. Thus, the processing ends. The predetermined processing will not be executed if notification of receipt etc. of the corresponding received message has already been made by the cellular phone 1 at the receiving end. Even when a specified date and time of notification has not been passed in the cellular phone 1 at the transmitting end, it is possible that the specified date and time of notification has been passed in the cellular phone 1 at the receiving end. This may occur if the current date and time obtained by the timer 34 or the like for the cellular phone 1 at the transmitting end does not match that obtained by the timer 34 or the like for the cellular phone 1 at the receiving end. This may also occur if the cellular phone 1 at the transmitting end and the cellular phone 1 at the receiving end are located in different countries with a time difference therebetween, or in different time zones.

With the cellular phone 1 described above, it is possible to prevent the user from forgetting to send an e-mail message when the user wants the recipient to check the message at a specific date and time, and it is also possible to prevent an intensive load from being imposed on the network at a specific date and time, by staggering a timing when plural cellular phones transmit e-mail messages. That is, since the cellular phone 1 at the transmitting end allows the user to send an e-mail message immediately after generating it, the user can be prevented from forgetting to send the generated message. Additionally, the cellular phone 1 at the receiving end does not perform any notification until a specified date and time of notification of receipt etc. is reached. Then, upon reaching the specified date and time, the cellular phone 1 at the receiving end behaves as if it has just received the message. Therefore, it is possible prevent e-mail messages from being transmitted and received on specific dates and times, such as Christmas and New Year's Day, when a large number of users want to send e-mail messages, and thus possible to reduce load on the network.

In the description above, when an e-mail message for which a date and time of notification is specified is received, the cellular phone 1 at the receiving end stores the received message in the date/time-specified-message storage unit 41 such that it cannot be viewed. Alternatively, like other received messages, a received message for which a date and time of notification is specified may be stored in the received-message storage unit 40. In the latter case, the mail reception controller 52 may be provided with a viewing restricting unit for setting viewable information about the received message, the information being viewable after receipt of the message until the specified date and time of notification is passed. For example, the viewing restricting unit can restrict viewable information to the sender's address and message subject. The viewing restricting unit may be configured to delete the received message after it is viewed.

With the configuration described above, since it is possible to check the sender etc. of a received message for which notification of the receipt has not yet been made, it is possible to reject the message if it is, for example, a junk message. If the received message is an unwanted junk message, it is possible to delete it before notification of the receipt is made.

The viewable information described above may be set either by the viewing restricting unit in the cellular phone 1 at the receiving end, or by that in the cellular phone 1 at the transmitting end at the time of transmission of an e-mail message.

In the above description, a date and time that is specified, after generation of an e-mail message, by the notification-date/time specifying unit 54 as a date and time of notification of receipt etc. is later than a date and time of transmission of the e-mail message. Alternatively, an already-passed date and time may be specified as a date and time of notification. The latter configuration is effective when an e-mail message is transmitted to a different country or region in a time zone behind that of the cellular phone 1 at the transmitting end.

In the embodiments described above, a date and time of notification of receipt of an e-mail message is specified by the cellular phone 1 at the transmitting end. Alternatively, only a date or time of notification of receipt may be specified.

In the embodiments described above, the information processing apparatus according to the present invention is applied to the cellular phone 1. The information processing apparatus according to the present invention is also applicable to a personal digital assistant (PDA), a personal computer, a portable game machine, a portable music player, a portable video player, and various other types of information processing apparatuses having an e-mail transmission/reception function.

A series of processing described in the above embodiments may be executed either by software or hardware.

Although the steps in the flowcharts in the above embodiments are processed sequentially in order of description, these steps may be processed simultaneously or individually.

What is claimed is:

1. An information processing apparatus comprising: a memory device configured to store a program; a processor configured to execute the program to perform overall control of the information processing apparatus; an electronic mail generating unit configured to generate an electronic mail; a notification-time specifying unit configured to specify a notification time at which notification of receipt of the received electronic mail is to be provided at a destination; a transmitting unit configured to transmit, to at least one other information processing apparatus, the electronic mail for which the notification time is specified by the notification-time specifying unit; a storage unit configured to store the transmitted electronic mail together with a time-specified mark and configured to delete the time-specified mark from the storage unit after passing of the specified notification time; and a time-change-instruction signal generating unit configured to generate, for the electronic mail for which the notification time is specified by the notification-time specifying unit, an instruction signal to change the specified notification time without deleting the received electronic mail at the destination, the instruction signal being generated by a sender of the electronic mail to change the specified notification time for notifying an electronic mail recipient of the receipt of the received electronic mail, the change of the specified notification time being made by the instruction signal with respect to the electronic mail that has already been sent to the recipient prior to the generation of the instruction signal, wherein the transmitting unit transmits the instruction signal generated by the time-change-instruction signal generating unit to the same destination as the destination of the transmitted electronic mail, and wherein the received electronic mail for which the notification time is specified and which is stored in the storage unit is not allowed to be accessed by a user until the notification time passes while a received electronic mail for which no notification time is specified and which is stored in the storage unit is allowed to be accessed by a user regardless of time.

2. The information processing apparatus according to claim 1, wherein the time-change-instruction signal includes at least a command for changing the specified notification time and a unique ID assigned to the electronic mail.

3. The information processing apparatus according to claim 1, further comprising a deletion-instruction signal generating unit configured to generate an instruction signal to delete the electronic mail for which the notification time is specified by the notification-time specifying unit,
wherein the transmitting unit transmits the instruction signal generated by the deletion-instruction signal generating unit to the same destination as the destination of the transmitted electronic mail.

4. The information processing apparatus according to claim 3, wherein the deletion-instruction signal includes at least a command for deleting the electronic mail and a unique ID assigned to the electronic mail.

5. The information processing apparatus according to claim 1, wherein the storage unit stores the electronic mail at least until the notification time specified for the electronic mail by the notification-time specifying unit is passed.

6. An information processing apparatus comprising:
a memory device configured to store a program;
a processor configured to execute the program to perform overall control of the information processing apparatus;
a receiving unit configured to receive, from at least one other information processing apparatus, an electronic mail for which a notification time at which notification of receipt of the electronic mail is to be provided is specified;
a storage unit configured to store the electronic mail received by the receiving unit;
a clock unit configured to provide time information;
a notification-time determining unit configured to determine whether a time obtained by the clock unit passes the notification time specified for the electronic mail;
a reception notification unit configured to notify receipt of the electronic mail stored in the storage unit if the notification-time determining unit determines that the specified notification time is passed; and
a notification-time changing unit configured to identify an electronic mail corresponding to a unique ID assigned to the electronic mail, the unique ID being included in an instruction signal, among plural electronic mails stored in the storage unit, and configured to change, without deleting the identified electronic mail, the notification time specified for the identified electronic mail based on the instruction signal, if the receiving unit receives the instruction signal to change the notification time specified for the electronic mail stored in the storage unit, the instruction signal being generated by a sender of the electronic mail to change the specified notification time for notifying an electronic mail recipient of the receipt of the received electronic mail, the change of the specified notification time being made by the instruction signal with respect to the electronic mail that has already been sent to the recipient prior to the generation of the instruction signal,
wherein the received electronic mail for which the notification time is specified and which is stored in the storage unit is not allowed to be accessed by a user until the notification time passes while a received electronic mail for which no notification time is specified and which is stored in the storage unit is allowed to be accessed by a user regardless of time.

7. The information processing apparatus according to claim 6, wherein the time information provided by the clock unit is information obtained from a network.

8. The information processing apparatus according to claim 6, further comprising an instruction-report transmitting unit configured to transmit a report stating that processing based on the instruction signal is not performed to a sender of the instruction signal, if the notification time specified for the electronic mail is not changed by the notification time changing unit.

9. The information processing apparatus according to claim 6, further comprising a message deleting unit configured to search an electronic mail corresponding to a unique ID assigned to the electronic mail, the unique ID being included in the instruction signal, among plural electronic mails stored in the storage unit, and configured to change the notification time specified for the electronic mail based on the instruction signal, if the receiving unit receives an instruction signal to delete the electronic mail stored in the storage unit.

10. The information processing apparatus according to claim 9, further comprising an instruction-report transmitting unit configured to transmit a report stating that processing based on the instruction signal is not performed to a sender of the instruction, if the electronic mail is not deleted by the message deleting unit.

11. The information processing apparatus according to claim 6, further comprising a setting unit configured to set browsable information related to the electronic mail stored in the storage unit, the information being browsable after the electronic mail is received by the receiving unit until the notification time specified for the electronic mail is passed.

12. The information processing apparatus according to claim 6, further comprising a second clock unit configured to provide time information,
wherein the second clock unit does not accept any change of setting of the time information.

* * * * *